United States Patent
Hilligardt et al.

(10) Patent No.: US 10,946,868 B2
(45) Date of Patent: Mar. 16, 2021

(54) METHODS AND DEVICES FOR AUTONOMOUS VEHICLE OPERATION

(71) Applicant: NIO USA, Inc., San Jose, CA (US)

(72) Inventors: Stefan T. Hilligardt, Half Moon Bay, CA (US); James S. Higgins, San Jose, CA (US); Abhishek Singhal, Santa Clara, CA (US); Rachad Youssef Gamarra, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 258 days.

(21) Appl. No.: 15/938,850

(22) Filed: Mar. 28, 2018

(65) Prior Publication Data

US 2019/0300007 A1    Oct. 3, 2019

(51) Int. Cl.
*B60W 50/029* (2012.01)
*B60W 50/02* (2012.01)
*G06F 16/22* (2019.01)

(52) U.S. Cl.
CPC ...... *B60W 50/029* (2013.01); *B60W 50/0205* (2013.01); *B60W 2556/45* (2020.02); *G06F 16/2282* (2019.01)

(58) Field of Classification Search
CPC .......... B60W 50/029; B60W 50/0205; B60W 2556/45; B60W 2050/0292; B60W 2050/022; B60W 2050/0215; B60W 60/0018; G06F 16/2282
See application file for complete search history.

(56) References Cited

U.S. PATENT DOCUMENTS

| | | | |
|---|---|---|---|
| 9,459,623 B1 | 10/2016 | Raghu | |
| 9,511,767 B1 | 12/2016 | Okumura et al. | |
| 9,523,984 B1 | 12/2016 | Herbach et al. | |
| 10,394,243 B1* | 8/2019 | Ramezani | G05D 1/0214 |
| 2017/0297565 A1* | 10/2017 | Joyce | B60W 50/029 |
| 2019/0258251 A1* | 8/2019 | Ditty | G05D 1/0088 |

* cited by examiner

*Primary Examiner* — Nga X Nguyen
(74) *Attorney, Agent, or Firm* — Sheridan Ross P.C.

(57) ABSTRACT

A device for controlling an autonomous vehicle includes a processor and a memory including instructions that, when executed by the processor, cause the processor to detect that the autonomous vehicle has one or more malfunctioning components and to determine, in response to the detection, a likelihood that the autonomous vehicle is able to reach a desired stop location based on one or more factors associated with the one or more malfunctioning components. The device determines at least one maneuver for the autonomous vehicle based on the likelihood, and causes the autonomous vehicle to perform the at least one maneuver.

20 Claims, 11 Drawing Sheets

| Component | Safety Score | Malfunction? | Type of Malfunction | Consequences | Weighting Factor | Final Score |
|---|---|---|---|---|---|---|
| GPS | 10 | Yes | Temporary (weak signal) | Unable to accurately navigate | 0.2 | 2 |
| RADAR | 5 | No | N/A | N/A | 0.5 | 2.5 |
| Camera | 5 | Yes | Temporary failure (dirt) | Unable to collect environment data | 0.5 | 2.5 |
| LIDAR | 10 | No | N/A | N/A | 1 | 10 |
| HVAC fan | 2 | Yes | Permanent (inoperable fan) | Unable to heat/cool cabin | 0.9 | 1.8 |
| Power Source | 10 | No | N/A | N/A | 1 | 10 |
| Sum of Final Scores | 28.8 | | | | | |
| Sum of Safety Scores | 42 | | | | | |
| Likelihood score | 68.6 | | | | | |

METHODS AND DEVICES FOR AUTONOMOUS VEHICLE OPERATION

FIELD

The present disclosure is generally directed to vehicle systems, in particular, toward methods and devices for autonomous vehicle operation.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new, they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

Autonomous vehicles include a variety of systems and components that allow for autonomous operation. As the field continues to develop, procedures are desired to control autonomous vehicles according to various scenarios, including possible emergency scenarios in which one or more of the vehicle's components malfunction, a driver/passenger of the vehicle becomes incapacitated, dangerous driving conditions exist, etc.

BRIEF DESCRIPTION OF THE DRAWINGS

FIG. 10 illustrates an example table used for determining the likelihood described with reference to FIGS. 8 and 9.

DETAILED DESCRIPTION

Figure 1:
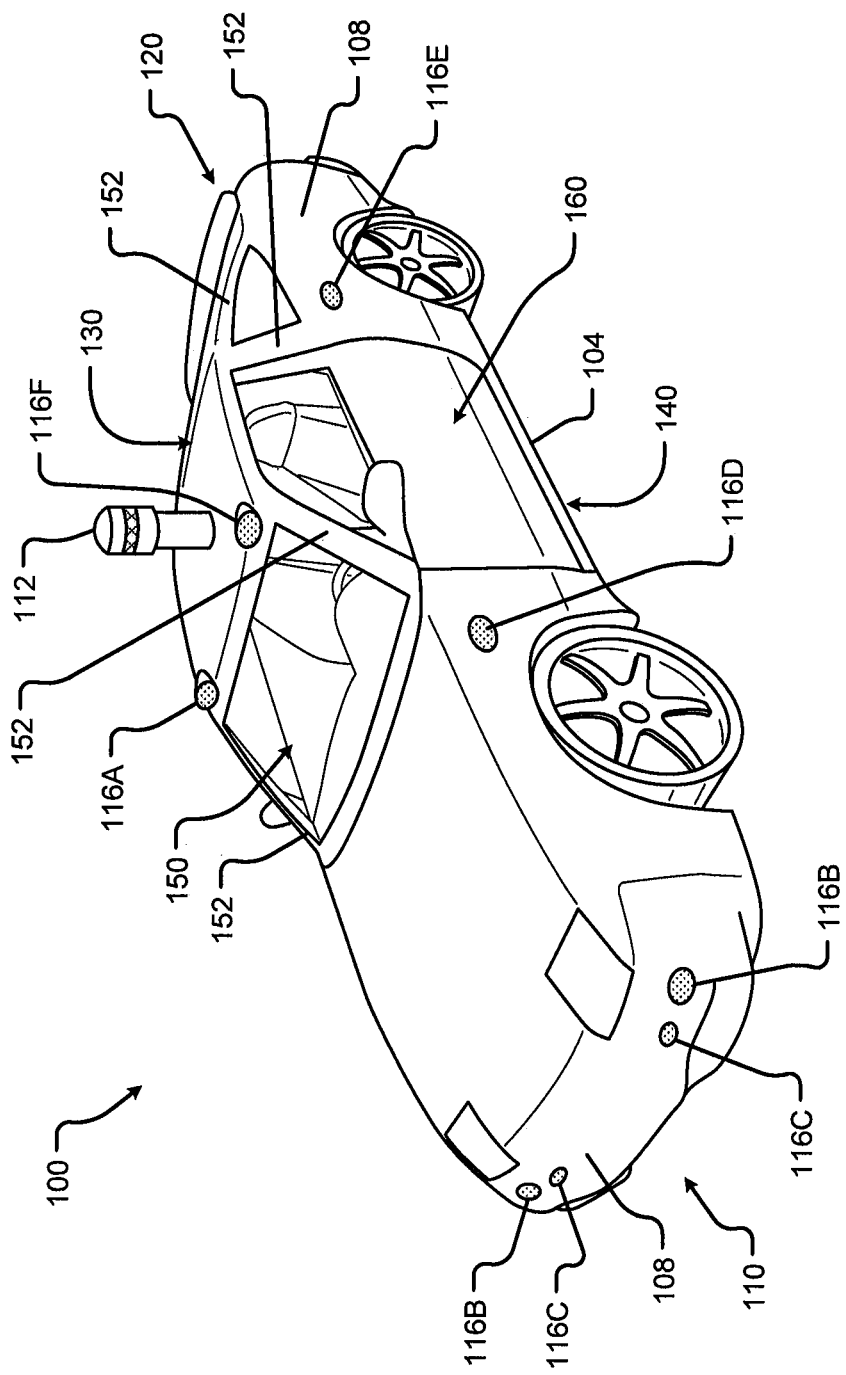
FIG. 1 shows a vehicle in accordance with embodiments of the present disclosure.

Embodiments of the present disclosure will be described in connection with a vehicle, and more particularly with respect to an automobile. However, for the avoidance of doubt, the present disclosure encompasses the use of the aspects described herein in vehicles other than automobiles.

An automated vehicle stop (AVS) is the process which navigates the vehicle to a safe location as part of an autonomous driving vehicle. AVS can either be initiated by the driver or automatically by the vehicle. The driver would, example initiate, an AVS in emergency like situations (e.g., upon experiencing chest pain). The vehicle manufacture can decide when a vehicle would initiate an AVS automatically. Scenarios include but are not limited to the vehicle reaching the end of an autonomous drive and the driver did not successfully take over control or the vehicle is in a degraded state and should stop within a certain timeframe. Ending an autonomous drive may be caused by reaching a destination, changes to the surrounding environment that would prevent or inhibit autonomous functionality such as heavy rain, changes to the vehicle's ability to receive accurate navigation information (e.g., a GPS dead zone), etc. In at least one example, the vehicle informs the driver of an expected vehicle behavior, such as an expected AVS operation or other operation. The vehicle may convey the expected behavior to the driver with audio and/or graphical notifications.

For an AVS, the vehicle should be able to determine the best place to stop (from among alternatives) as an accepted stop location (ASL or desired stop location) based on environmental and vehicle conditions. The location can feature certain properties which include, but are not limited to the following: protected from main traffic flow, ability to merge back into traffic, and/or occupants can exit the vehicle. The surface of an ASL does not have to be pavement, any drivable surface is sufficient. Examples of an ASL are parking lots or rest areas. Whenever several ASLs are available, the best location is chosen based on the features described above.

The vehicle will constantly calculate driving trajectories to ASLs in the background. These pre-calculated driving trajectories will support the maneuver especially in the case of a sensor failure. For example, degraded visibility due to the failure of a long-range sensor will make it extremely difficult or even impossible to calculate a trajectory to an ASL; short range sensors still should be available to validate the maneuver by detecting pedestrians or other traffic participants in close proximity.

The vehicle should perform alternative maneuvers in the event that an ASL is not within reachable distance either due to the fact that there is no ASL or the vehicle is in a state where it can no longer navigate to the ASL. The vehicle should decide if it is still able to keep driving in a degraded state or if it has to stop immediately. Continue driving should be the preferred option (one reason being current ACC systems do not stop for stationary objects). While the vehicle is driving it will continuously check if the system capabilities have changed to ensure that the vehicle will stop at an ASL as soon as possible. In addition to that it will continuously search the environment for ASLs.

In addition to initiating an AVS as described above the vehicle should also offer the option of a panic stop (PS). PS provides the opportunity to immediately stop the vehicle. Once PS has been initiated the vehicle will instantly apply full braking. The vehicle will stay within its lane and abort any maneuver. The mission is complete once the vehicle comes to a complete stop. If the steering wheel is within reach of the driver, the driver should have the option to take over steering control. PS is only available whenever the vehicle is able to automatically stay within its lane.

FIG. 1 shows a perspective view of a vehicle (e.g., electric vehicle) 100 in accordance with embodiments of the present disclosure. The vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
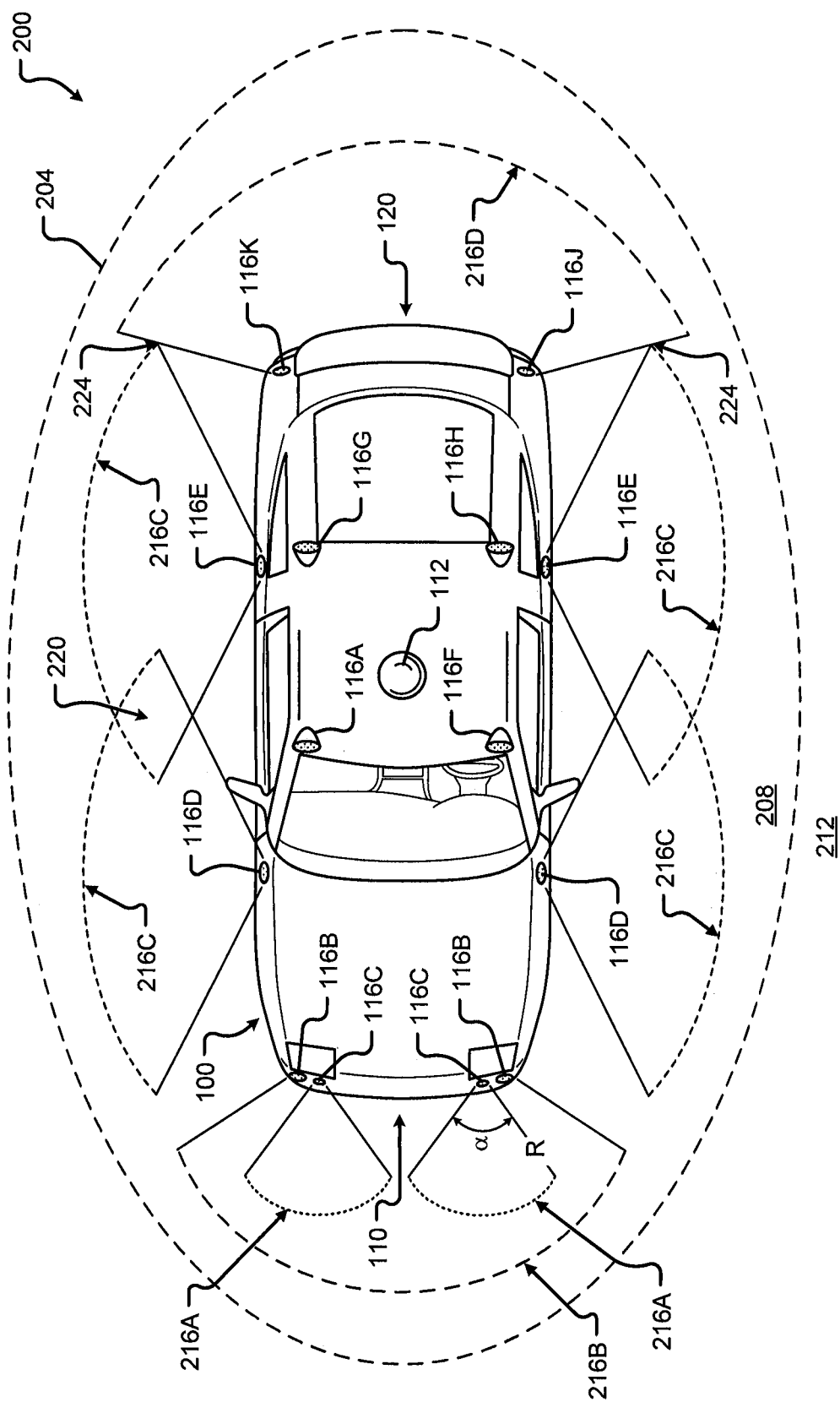
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
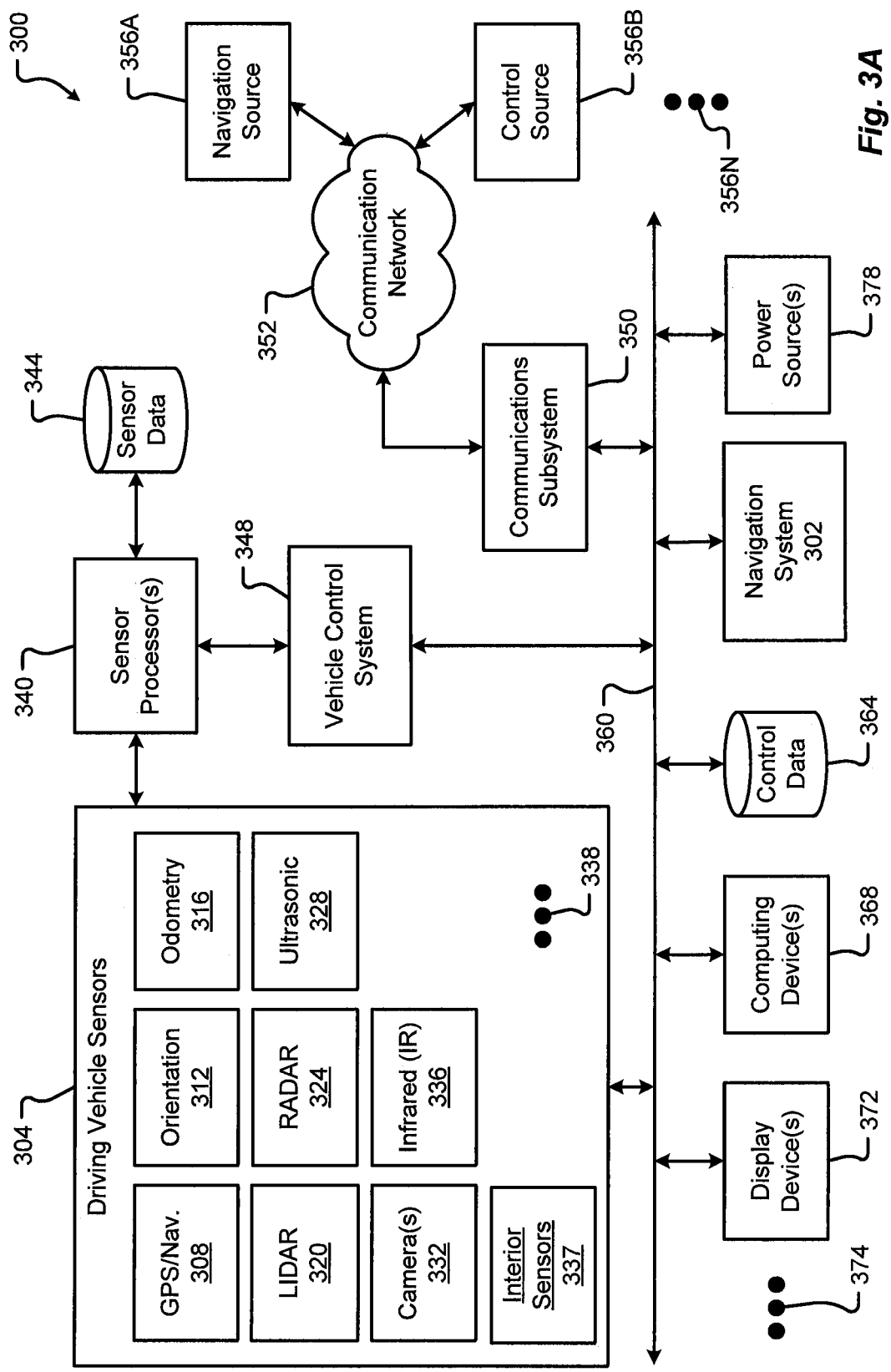
FIG. 3A is a block diagram of an embodiment of a communication environment of the vehicle in accordance with embodiments of the present disclosure.
Figure 3B:
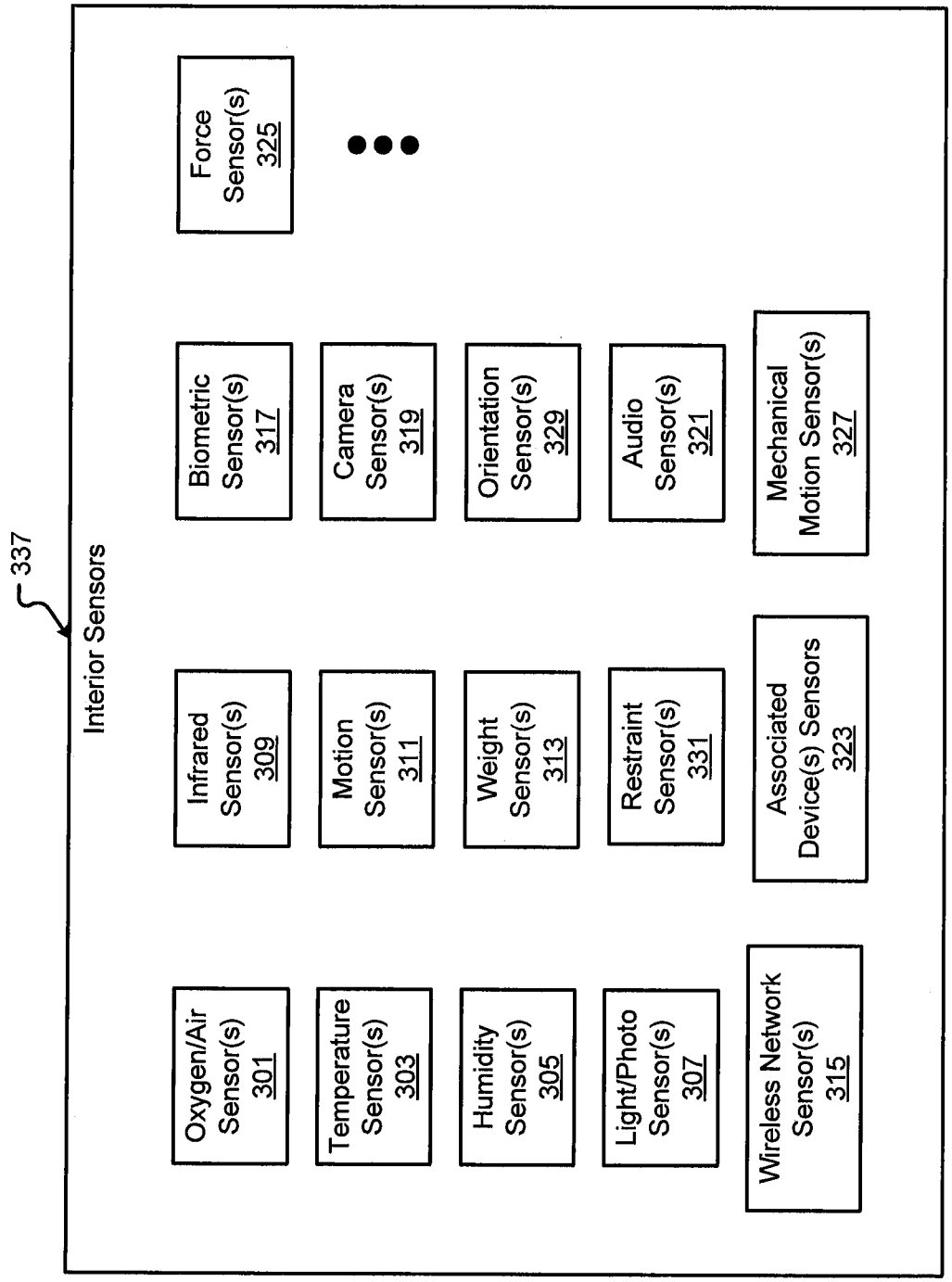
FIG. 3B is a block diagram of an embodiment of interior sensors within the vehicle in accordance with embodiments of the present disclosure.
Figure 3C:
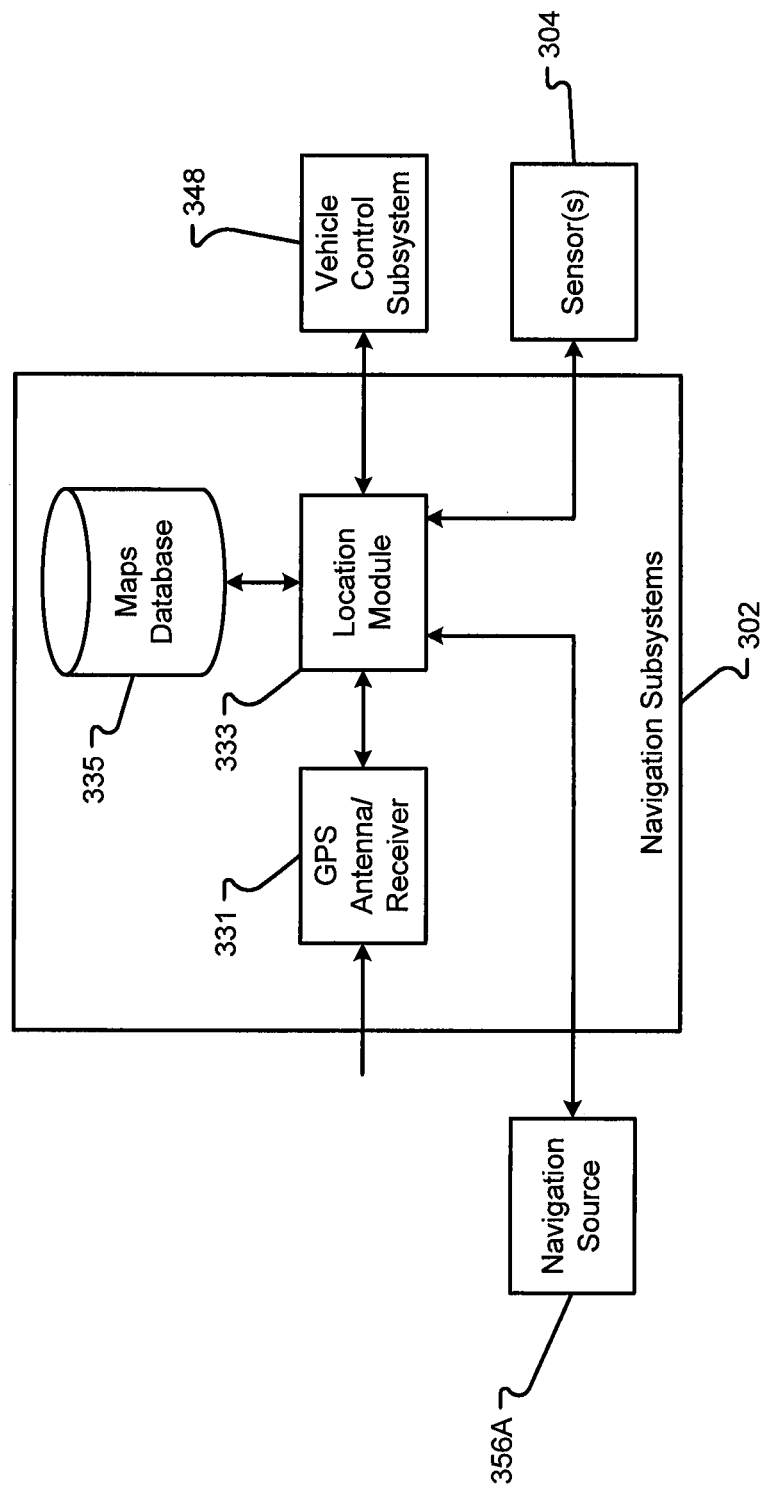
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, power sources 378, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the vehicle 100 may include one or more power sources 378. These one or more power sources 378 may be configured to provide drive or traction power, system and/or subsystem power, accessory power, etc. While described herein as a single power source 378 for sake of clarity, embodiments of the present disclosure are not so limited. For example, it should be appreciated that independent, different, or separate power sources 378 may provide power to various systems of the vehicle 100. For instance, a drive power source may be configured to provide the power for the one or more electric drive motors of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 378 in this manner may provide a number of benefits over conventional vehicle systems. For example, separating the power sources 378 may allow one power source 378 to be removed and/or replaced independently without requiring that power be removed from all systems and/or subsystems of the vehicle 100 during a power source 378 removal/replacement. For instance, one or more of the accessories, communications, safety equipment, and/or backup power systems, etc., may be maintained even when a particular power source 378 is depleted, removed, or becomes otherwise inoperable.

The power source 378 may include a charge controller that may be configured to determine charge levels of the power source 378, control a rate at which charge is drawn from the power source 378, control a rate at which charge is added to the power source 378, and/or monitor a health of the power source 378 (e.g., one or more modules, cells, portions, etc.). In some embodiments, the charge controller or the power source 378 may include a communication interface. The communication interface can allow the charge controller to report a state of the power source 378 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The vehicle 100 can also include one or more interior sensors 337. Interior sensors 337 can measure characteristics of the inside environment of the vehicle 100, including various states or conditions of the driver and/or passengers. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, first audio sensors 321 may be located in a first area of the vehicle 100 and second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
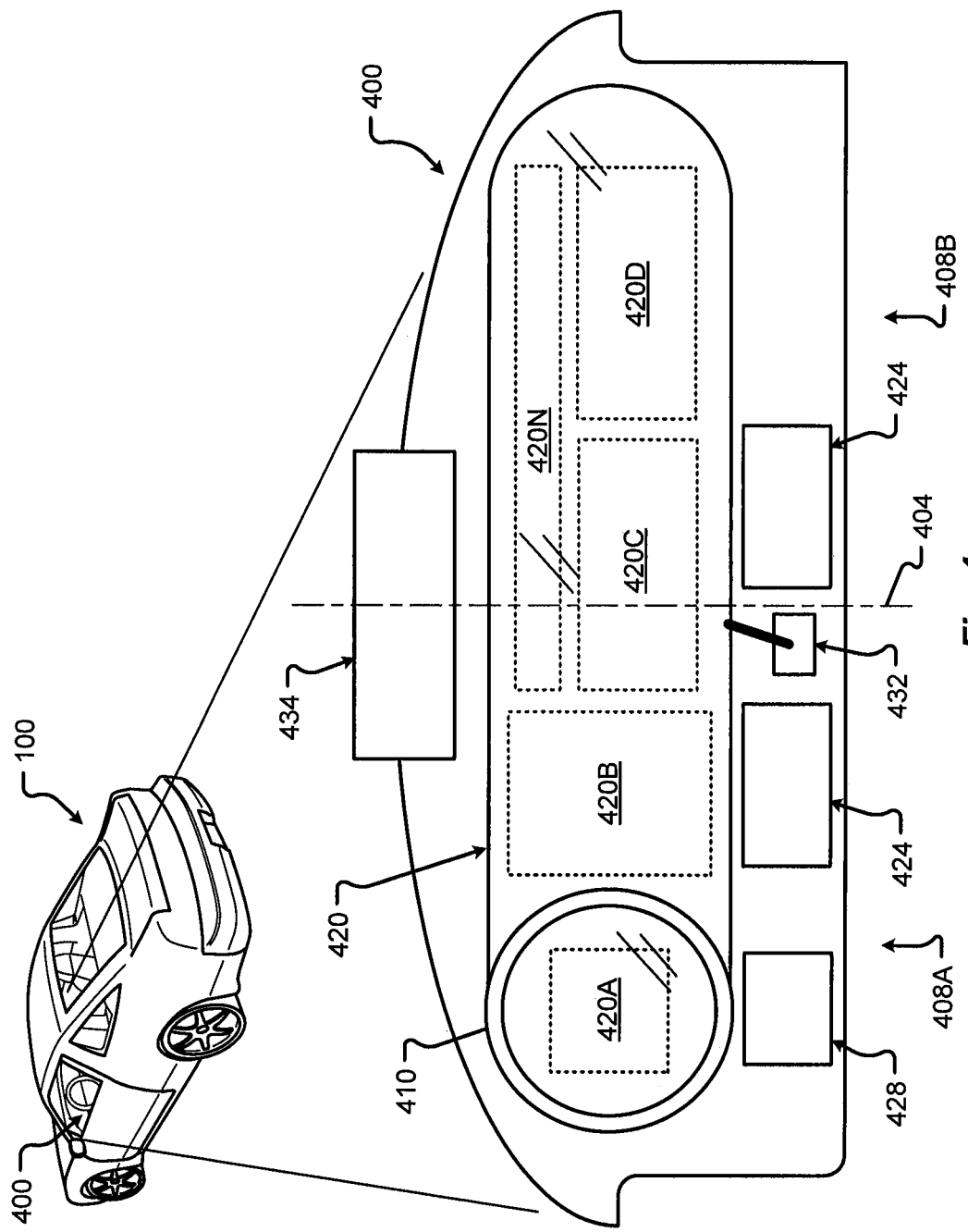
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
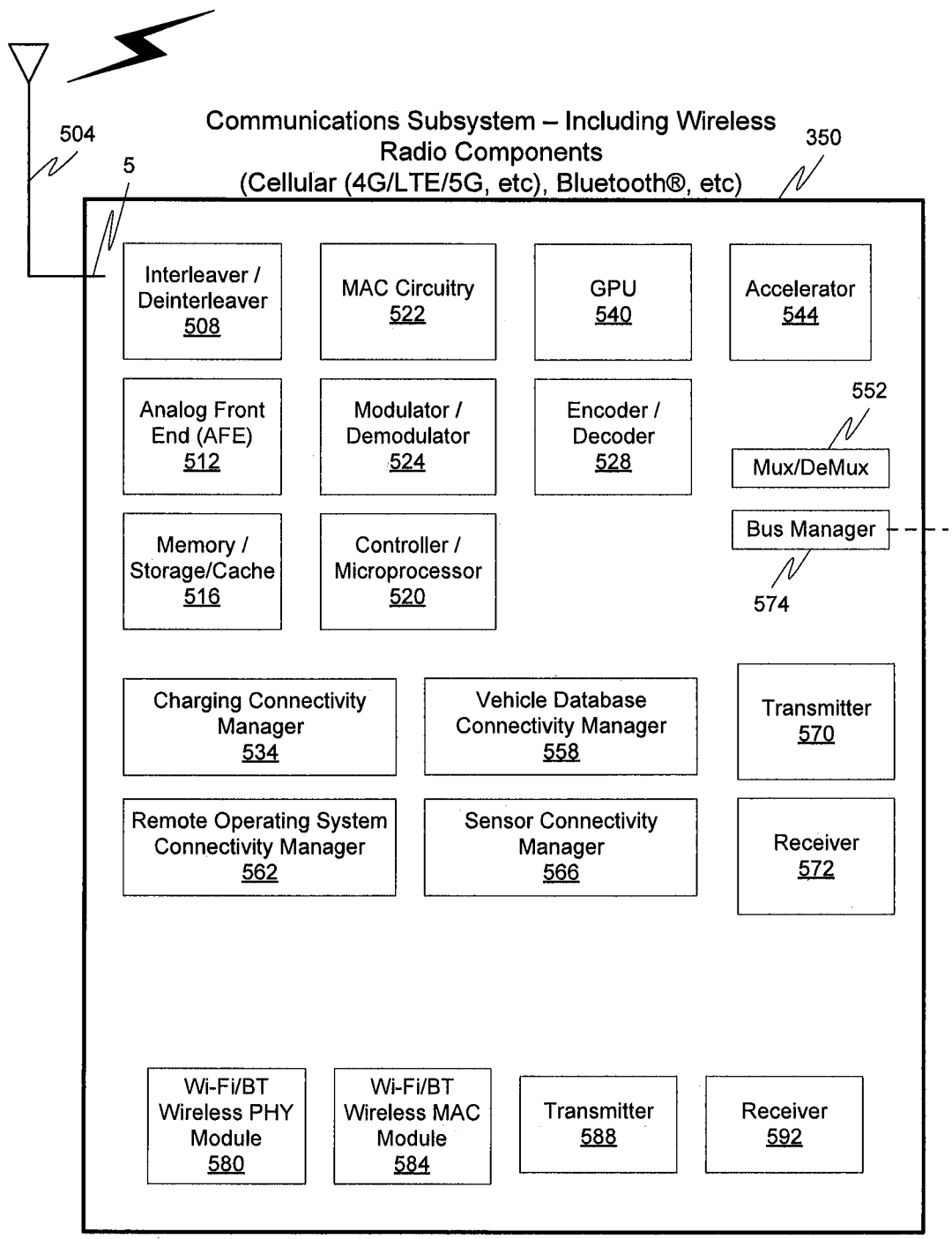
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is used to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is used.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
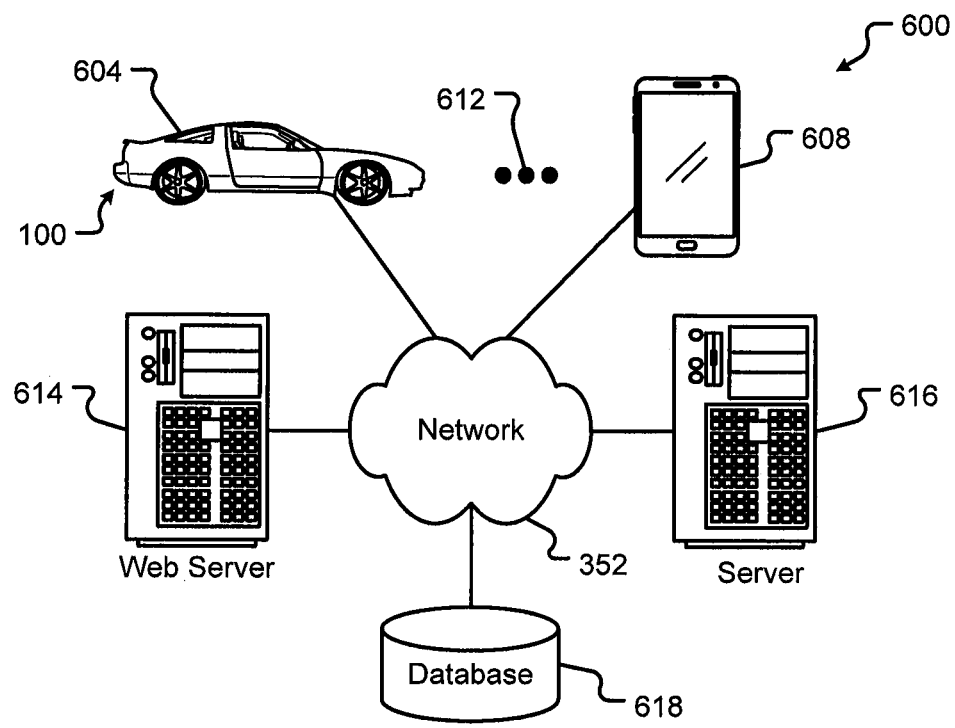
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific desires and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
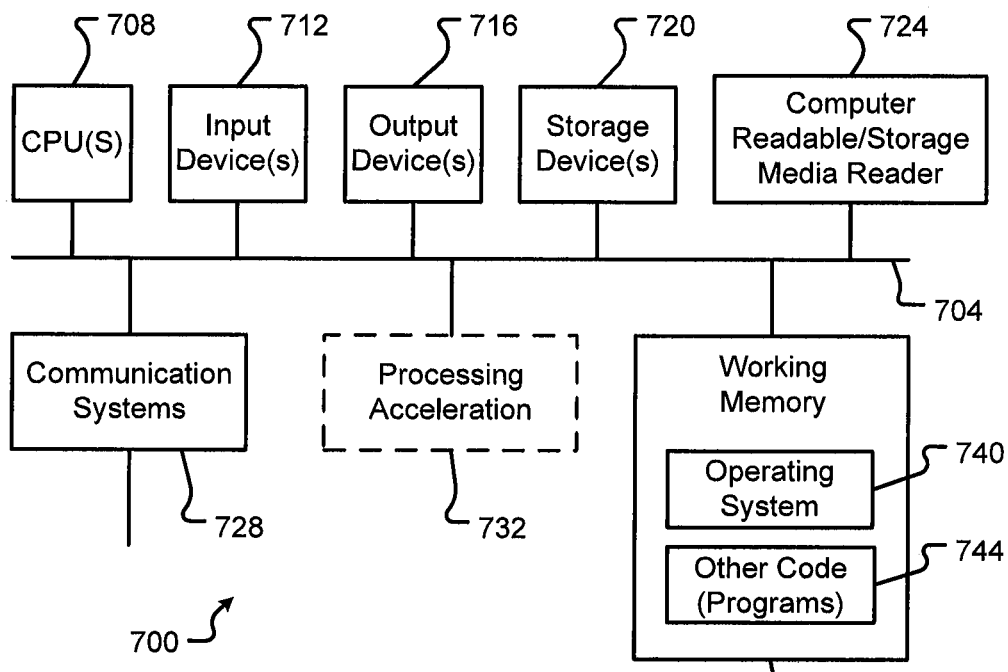
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 8:
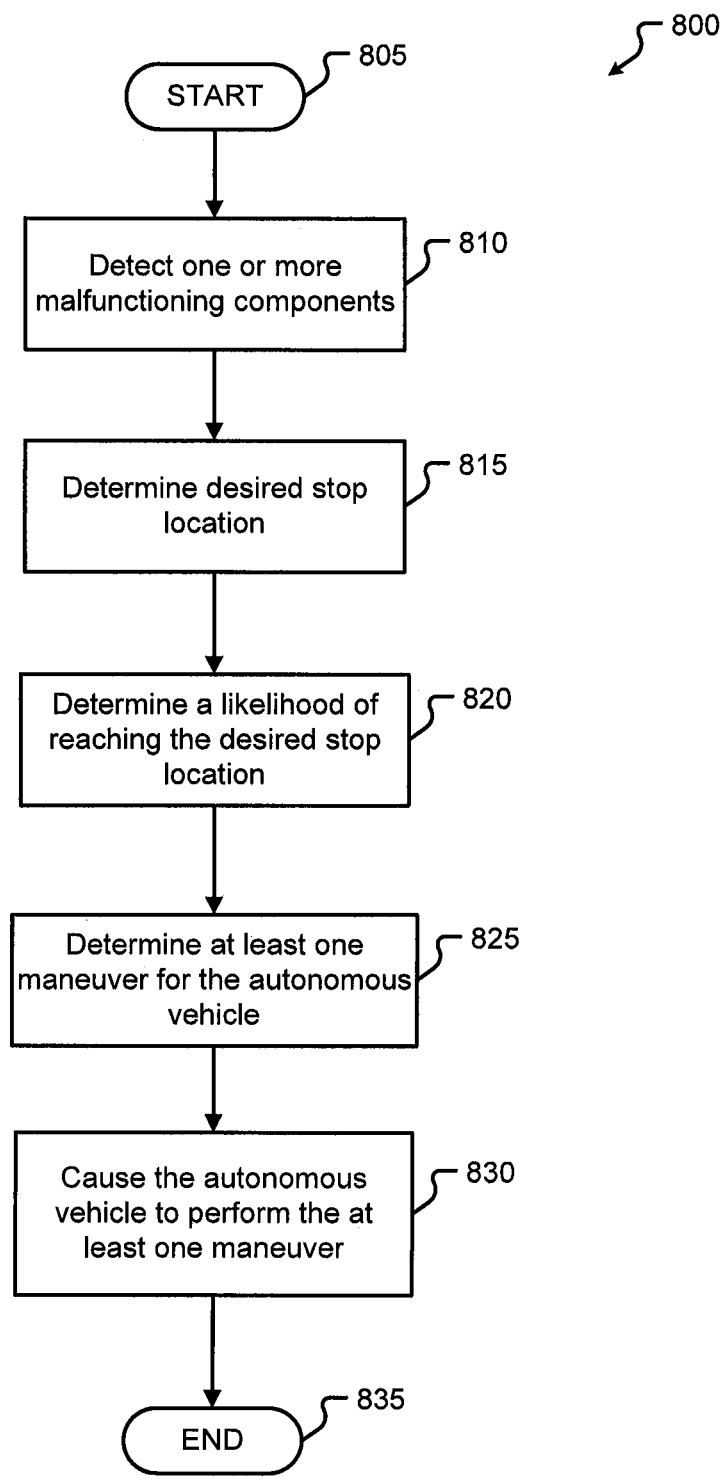
FIG. 8 is a flow diagram illustrating example operations of the system(s) in FIGS. 1-7.

FIG. 8 is a flow diagram illustrating example operations of the system(s) in FIGS. 1-7. In more detail, the operations of FIG. 8 are carried out for an automated vehicle stop operation, for example, during autonomous driving (e.g., for Levels 3-5 of autonomy).

While a general order for the steps of the method 800 is shown in FIG. 8, the method 800 can include more or fewer steps or can arrange the order of the steps differently than those shown in FIG. 8. Generally, the method 800 starts at operation 805 and ends at operation 830. The method 800 can be executed as a set of computer-executable instructions executed by the control system (that includes one or more processors 708) 348 and encoded or stored on a computer readable medium (e.g., control data storage 364, storage device 720, etc.). Alternatively, the operations discussed with respect to FIG. 8 may be implemented by the various elements of the system(s) FIGS. 1-7. Hereinafter, the method 800 shall be explained with reference to the systems, components, assemblies, devices, user interfaces, environments, software, etc. described in conjunction with FIGS. 1-7.

In operation 810, the method 800 detects that the vehicle 100 (or autonomous vehicle 100) has one or more malfunctioning components that may affect operation of the vehicle 100. In other words, operation 810 initiates an automated vehicle stop operation. For example, one of the vehicle sensors 304 or power sources 378 (e.g., batteries, battery modules, and/or battery cells, etc.) may fail or become compromised in a manner that inhibits the vehicle's 100 ability to continue normal operation. However, example embodiments are not limited thereto, as any one of the components illustrated in FIGS. 1-7 (as well as those not illustrated) may be subject to failure and detection of the failure. The method 800 may also initiate the automated vehicle stop operation when a driver of the vehicle 100 does not assume control over the vehicle 100 when requested or within a certain amount of time of a request (e.g., where the vehicle 100 is entering an area where autonomous driving is not supported, where the vehicle's interior sensors detect that the driver is unresponsive or experiencing a medical emergency, etc.). In this case, operation 810 includes detecting that the driver has not taken control of the vehicle 100 subsequent to a request to do so (e.g., within a desired threshold amount of time of the request).

In operation 815, the method 800 determines a desired stop location for the vehicle 100. For example, the method 800 may determine the desired stop location based on environmental surroundings sensed by the vehicle 100 and on information received from an external source (e.g., navigation source 356A, control source 356B, etc.). Here, the external source (e.g., navigation source 356A) may include one or more high-definition (HD) maps that are useful for determining a stop location that is beyond the ranges of the vehicle's sensors. Additionally or alternatively, the external source may include at least one second device associated with at least one second autonomous vehicle (a vehicle other than the vehicle attempting to find a stop location) to generate information relating to the desired stop location based on surroundings sensed by the at least one second autonomous vehicle. Here, the (first) autonomous vehicle 100 may further determine the desired stop location based on the information. According to at least one example embodiment, the desired stop location is a location relatively insulated from moving traffic or other hazards. For example, the desired stop location may be a rest area, an exit ramp (e.g., shoulder of an exit ramp), a pull out along a highway, etc. In the event that operation 810 detects the driver has not taken control of the vehicle 100 subsequent to the request to do so, operation 815 may include determining the stop location based on factors that include weather, traffic, distance to a stop location, a sensed and/or received condition of the driver or other passengers (e.g., scenarios where the vehicle's 100 interior sensors detect that the driver is incapable of taking control as a result of a medical emergency or other inhibited state).

In operation 820, the method 800 determines, in response to the detection in operation 810, a likelihood that the autonomous vehicle 100 is able to reach a desired stop location based on one or more factors associated with the one or more malfunctioning components. In general, the likelihood may be computed, using the one or more factors, as a percentage or other value indicative of the vehicle's 100 chances of reaching the desired stop location with the one or more malfunctioning components. Computation of the likelihood is discussed in more detail below with reference to FIG. 10.

According to at least one example embodiment, the one or more factors include at least one of an indication of a type of the one or more malfunctioning components (e.g., an indication of the type of sensor, such as LIDAR, camera, etc.), an indication of a type of malfunction of the one or more malfunctioning components (e.g., an indication that the component has experience complete failure, partial failure, etc.), and an indication of a current effect or an anticipated effect of the type of malfunction on the autonomous vehicle (e.g., an indication navigation abilities are inhibited or impossible if the GPS 308 fails, an indication that navigation abilities are not affected if some other component fails such as an HVAC component, etc.). In other words, the one or more factors are indicative of at least one of current consequences and possible future consequences resulting from the one or more malfunctioning components. In the event that operation 810 detects the driver has not taken control of the vehicle 100 subsequent to the request to do so, the one or more factors may include weather, traffic, distance to a stop location, a sensed and/or received condition of the driver or other passengers, etc. For example, if the vehicle 100 detects a medical emergency for the driver, the likelihood may be determined based on the vehicle's 100 estimated ability to navigate to a nearby hospital or similar treatment location within a desired amount of time of the detection so that the driver can receive appropriate medical care. According to at least one example embodiment, the one or more factors are stored in a table on a memory (e.g., memory 364, storage device 720, etc.). The one or more factors are described in more detail below with reference to FIG. 10.

In operation 825, the method 800 determines at least one maneuver for the autonomous vehicle 100 based on the likelihood.

In operation 830, the method 800 causes the autonomous vehicle 100 to perform the at least one maneuver. Operations 825 and 830 are described in more detail below with respect to FIG. 9.

Figure 9:
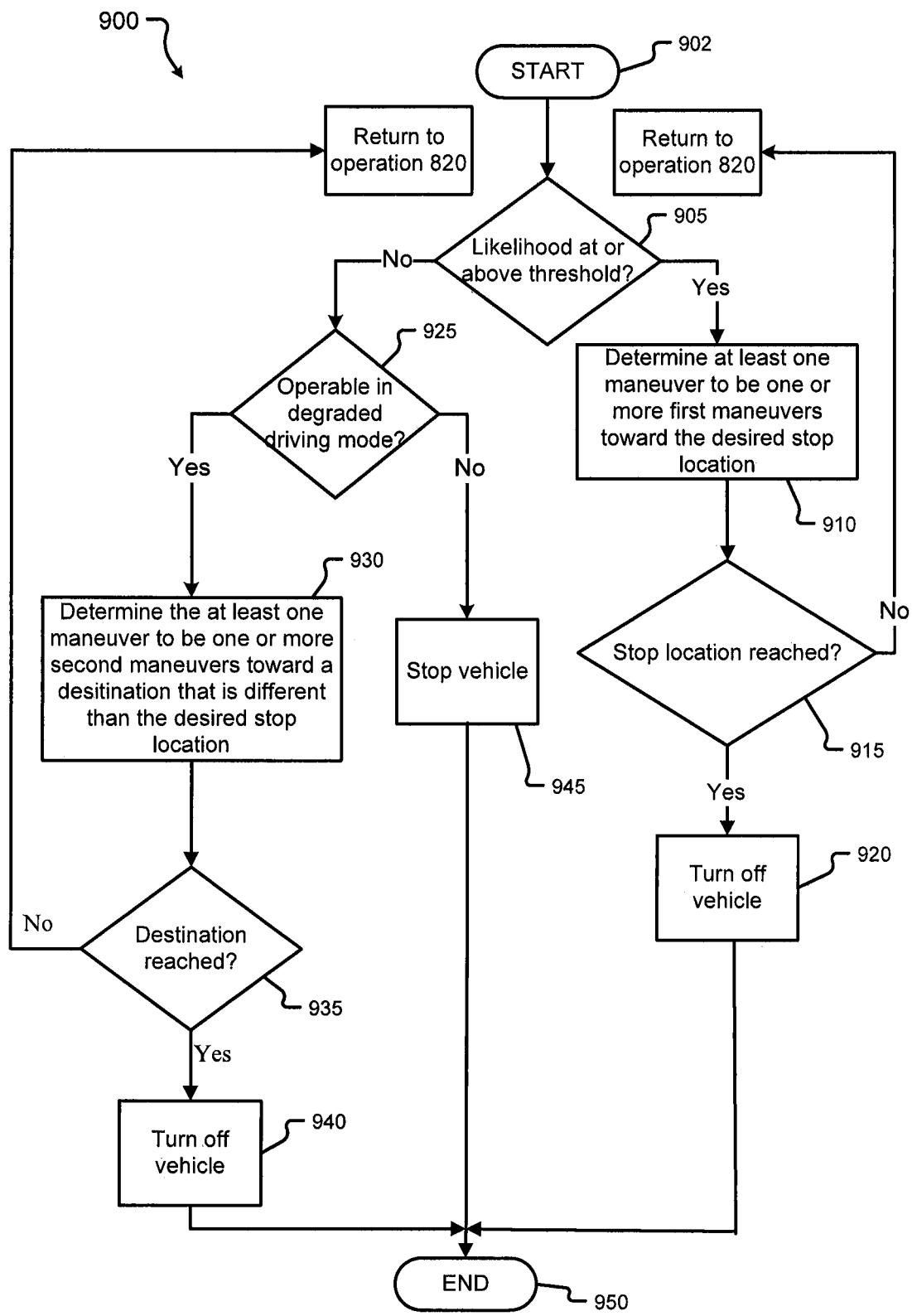
FIG. 9 is a flow diagram illustrating example operations of the system(s) in FIGS. 1-7.

FIG. 9 is a flow diagram illustrating example operations of the system(s) in FIGS. 1-8. In particular, the operations of FIG. 9 describe operations 825 and 830 in more detail.

While a general order for the steps of the method 900 is shown in FIG. 9, the method 900 can include more or fewer steps or can arrange the order of the steps differently than those shown in FIG. 6. Generally, the method 600 starts at operation 602 and ends at operation 650. The method 600 can be executed as a set of computer-executable instructions executed by the control system (that includes one or more processors 708) 348 and encoded or stored on a computer readable medium (e.g., control data storage 364). Alternatively, the operations discussed with respect to FIG. 9 may be implemented by the various elements of the system(s) FIGS. 1-8. Hereinafter, the method 900 shall be explained with reference to the systems, components, assemblies, devices, user interfaces, environments, software, etc. described in conjunction with FIGS. 1-8.

In operation 905, the method 900 determines whether the likelihood determined in operation 820 is at or above a threshold. The threshold may be a design parameter set based on empirical evidence and/or user preference. If so, the method 900 proceeds to operation 910.

That is, in operation 910, the method 900 determines the at least one maneuver to be or more first maneuvers toward the desired stop location when the likelihood is at or above a threshold.

In operation 915, the method 900 determines whether the desired stop location has been reached. If not, the method 900 returns to operation 820 in FIG. 8 to update the likelihood as the vehicle 100 maneuvers toward the stop location. If so, the method 900 proceeds to operation 920 and turns off the vehicle 100.

If, in operation 905, the likelihood is below the threshold, the method 900 proceeds to operation 925. In operation 925, the method 900 determines whether the autonomous vehicle 100 is operable in a degraded driving mode when the likelihood is at or below the threshold based on the one or more factors. The degraded driving mode represents a mode in which the vehicle 100 has detected one or more malfunctioning components, determined that a desired stop location is not reachable, but also determined that the vehicle 100 is still functional enough to continue operation (e.g., autonomous operation) to reach an alternative destination. In operation 925, the method 900 may determine whether the vehicle 100 is operable in the degraded driving mode by comparing the likelihood determined in operation 820 to a second threshold (e.g., a threshold that is lower than the threshold used in the comparison at operation 905). Accordingly, if operation 925 determines that the vehicle 100 is operable in the degraded driving mode, then the method 900 proceeds to operation 930.

In operation 930, the method 900 determines the at least one maneuver to be one or more second maneuvers toward a destination different than the desired stop location.

In operation 935, the method 900 determines whether the destination has been reached. If not, the method 900 returns to operation 820 to update the likelihood as the vehicle 100 maneuvers toward the destination. If so, the method 900 proceeds to operation 940 to turn off the vehicle.

If, in operation 925, the method 900 determines that the vehicle 100 is not operable in the degraded driving mode, then the method 900 proceeds to operation 945 and determines the at least one maneuver to be a stop operation that causes the autonomous vehicle 100 to stop. For example, operation 945 may include a gradual application or a rapid application of the vehicle's 100 brakes depending on sensed surroundings of the vehicle. Stopping the vehicle 100 in this manner may correspond to a situation in which the vehicle 100 is no longer safe to operate and, as such, should be stopped as soon as possible.

In view of the return to operation 820, it should be appreciated that the method 900 continuously updates the likelihood while the autonomous vehicle performs at least one of the one or more first maneuvers and the one or more second maneuvers in order to determine whether to change the at least one maneuver based on the updated likelihood. For example, if the method 900 initially determines that the likelihood is above the threshold, it is possible that additional components may malfunction during the trip toward the desired stop location that cause the likelihood to fall below the threshold. In this case, because of the return to operation 820 from operation 915, the method 900 will cause the vehicle 100 to enter into the series of operations beginning at operation 925 upon determining that the likelihood is below the threshold.

FIG. 10 illustrates an example table 1000 used for determining the likelihood described with reference to FIGS. 8 and 9.

As shown, the table 1000 may include a list of vehicle components that includes some or all of the components from FIGS. 1-7 and/or additional components not specifically illustrated but understood to be part of the vehicle 100. Each component in the list may include an associated safety score that indicates a level of safety associated with that component. That is, each safety score is indicative of an importance of a respective malfunctioning component to the operation of the autonomous vehicle 100. A component with a high safety score may be considered as a component that is considered highly relevant for safe operation of the autonomous vehicle 100 while a component with a lower safety score may be considered as a component that is ancillary to safe operation of the autonomous vehicle 100. For example, the safety scores may range from 1 to 10, where a score of 10 indicates that particular component is considered highly important to safe operation of the vehicle 100 while a score of 1 indicates that a particular component is not as important to safe operation of the vehicle 100. However, example embodiments are not limited thereto and any range of scores may be used according to design preferences. According to at least one example embodiment, the safety scores may be fixed (e.g., set by the manufacturer of the vehicle 100) or variable (e.g., changed as a result of a software update to the vehicle's 100 systems).

With reference to the example table 1000 of FIG. 10, it is assumed that the vehicle's 100 primary sensor for tracking roadway objects and making autonomous driving decisions is the LIDAR sensor 320. Thus, the table includes a high safety score (e.g., 10) for the LIDAR sensor 320 because a malfunction of the LIDAR sensor 320 is highly likely to render autonomous vehicle operation unsafe. Likewise, the power source 378 is vital to operation of the vehicle 100 so that this component also has a safety score of 10. However, a component that is considered less vital to safe operation of the autonomous vehicle 100, such as an HVAC component (e.g., HVAC fan), has an associated lower safety score (e.g., 2) because failure of that component is not likely to render autonomous operation of the vehicle 100 unsafe. Meanwhile, in the example table 1000 of FIG. 10, the RADAR sensor 324 and the camera 332 are usually not involved in maneuver decisions during autonomous operation of the vehicle 100, and thus, have lower safety scores (e.g., 5) than the LIDAR sensor 420. However, it should be appreciated that the RADAR sensor 424 and at least one camera 432 may serve as backups for the LIDAR sensor 320, which places their respective safety scores at or near the middle of the safety score range. Each safety score may be a design parameter set based on empirical evidence and/or preference.

The table 1000 may include a number of other fields that become active upon detecting a malfunction of a corresponding component or receiving an input from a user of the vehicle 100. In FIG. 10, these fields indicate whether the component is malfunctioning, the type of and/or reason for the malfunction, as well as current and/or possible consequences that are occurring or that may occur as a result of the malfunction. This information may be gleaned from a variety of sources including but not limited to the malfunctioning component itself, programming of the vehicle 100, data gathered by the vehicle 100 from external sources (e.g., sources 356A-356N, other vehicles, etc.), data gathered by functioning sensors of the vehicle 100, etc.

As shown in FIG. 10, the table 1000 may further include a variable weighting factor and a final score for each component. Here, each final score is calculated by multiplying the safety score by the weighting factor. Subsequently, the vehicle's 100 control system (e.g., control system 348) may access all of the information in the table to compute a likelihood score by dividing a sum of the final scores by a sum of the safety scores and multiplying the result by 100. The likelihood score is indicative of how likely the vehicle 100 will be able to reach the desired stop location or alternate destination. In other words, the likelihood score represents the likelihood determined in operation 820 of FIG. 8. Although possible and within the scope of example embodiments, it should be understood that the percentage does not necessarily correspond to a percent chance that the vehicle 100 will reach the desired stop location or other destination.

FIG. 10 shows an example where the weighting factors range from zero to one, but example embodiments are not limited thereto, and the weighting factor range may be adjusted according to design preferences. As shown in FIG. 10, the weighting factor affects each corresponding final score, which in turn affects the likelihood score. As noted in the discussion of FIGS. 8 and 9, the likelihood score will be compared to a threshold(s) to determine the at least one maneuver of the vehicle 100. Each weighting factor may be a design parameter set based empirical evidence and/or user/manufacturer preference. According to at least one example embodiment, the weighting factor may be fixed (e.g., at a value set by the manufacturer) or variable for components functioning normally (e.g., RADAR sensor 324, LIDAR sensor 320, and power source 378 in FIG. 10). According to at least one example embodiment, the weighting factor may be fixed or variable for malfunctioning components (e.g., GPS 308, HVAC, camera 332).

In any event, each weighting factor may be based on a number of factors including but not limited to a respective safety score of the component, the number/functionality of available backup components that could be substituted if a primary component malfunctions, information gathered from the malfunctioning component, information that is programmed into the vehicle 100, data (e.g., weather data, traffic data, etc.) gathered by the vehicle 100 from external sources (e.g., sources 356A-356N, other vehicles, etc.), data gathered by normally functioning sensors of the vehicle 100, an estimated distance to or time of arrival at a desired stop location or other destination, etc.

In the example of FIG. 10, a high weighting factor (e.g., 10) is determined for the LIDAR sensor 320 and the power source 378 because these components are functioning normally and because these components have a high safety score. Because the LIDAR sensor 320 and the power source 378 are considered important to safety as indicated by their safety scores and because these components are functioning normally, their respective final scores should be relatively high in order to have the desired effect on the likelihood score (i.e., to increase the likelihood score).

On the other hand, the high safety score of the GPS 308 combined with its ongoing malfunction results in a relatively low weighting factor of 0.2. Because the GPS 308 is considered important to safety and because the GPS 308 is malfunctioning, its respective final score should be relatively low in order to have the desired effect on the likelihood score (i.e., to decrease the likelihood score compared a situation in which the GPS 308 is functioning normally). Here, it should be understood that a permanent malfunction of the GPS 308 would result in an even lower weighting factor (e.g., zero) to lower the likelihood score, and that a properly functioning GPS 308 would have a higher weighting factor (e.g., 1.0) to raise the likelihood score. This notion applies to any or all other components listed in the table.

As also shown in FIG. 10, the weighting factor for the camera 332 is determined as 0.5 and the weighting factor for the HVAC is determined as 0.9. Here, it should be appreciated that the camera's weighting factor and safety score lies between the weighting factor and safety score of the LIDAR sensor 320 and the weighting factor and safety score of the GPS 308 because, although the camera 332 is malfunctioning, the camera 332 is not considered as vital to safe operation of the vehicle 100 as the LIDAR sensor 320 being used to make autonomous driving decisions (e.g., because the camera 332 is a secondary or backup sensor for making autonomous driving decisions). If the camera 332 returns to normal function, the weighting factor of the camera 332 may be raised.

According to at least one example embodiment, if the LIDAR sensor 320 permanently malfunctions and the RADAR sensor 324 is operational and can serve as a backup component for making autonomous driving decisions, then the safety scores and/or the weighting factors of each component may be adjusted accordingly. For example, the safety scores and/or the weighting factors may be swapped or adjusted so that the final score for the RADAR sensor 324 is raised and the final score of the LIDAR sensor 320 is lowered to have the desired effect on the likelihood score. Here, it should be appreciated that the amount of adjustment to the safety scores and/or the weighting factors of the RADAR sensor 324 and the LIDAR sensor 320 is based on whether the RADAR sensor 324 can provide a complete or partial replacement of the LIDAR sensor 320.

It should be appreciated that the same or similar logic as that discussed above for determining/adjusting safety scores and weighting factors applies to all components of the vehicle 100 that have some level of safety concern (and not just components those listed in the table 1000 of FIG. 10). Although example embodiments have been discussed with reference to specific scores and weighting factors (or weights) it should be understood that example embodiments are not limited thereto. Example embodiments encompass other values of scores and weights than those specifically referenced herein.

Although not explicitly shown in FIG. 10, it should be understood that the table 1000 may include fields related to the condition of the driver or other passengers in the cabin of the vehicle 100 that also affect the likelihood score in the same or similar manner as described above for components of the vehicle 100. In one example, it should be understood that a driver or other passenger of the vehicle 100 may initiate the operations in FIGS. 8 and 9, for example, in an emergency (e.g., when experiencing chest pain, when experiencing dangerous weather, etc.). In this case, interior sensors 337 of the vehicle 100 may assess the condition of the driver and determine the desired stop location or other destination according to various factors sensed by the interior sensors 337, such as heart rate, skin temperature, blood pressure, etc. It should be understood that the assessment of the driver/passenger may affect the likelihood score in conjunction with or separately from the assessment of the vehicle's 100 components.

In view of the foregoing description, it should be appreciated that one or more example embodiments provide methods and devices for controlling an autonomous vehicle upon detection of a malfunctioning component or upon initiation of an emergency event by a user or driver of the vehicle. Example embodiments provide for finding a desired stop location or other destination to stop the vehicle by continuously assessing the functionality of the vehicle's components and/or passengers upon detection of a malfunctioning component or upon detection of an emergency event initiated by the driver. As a result, example embodiments may provide for safe operation of the vehicle for as long as possible in order to reach a safe stop location.

Embodiments of the present disclosure include a device for controlling an autonomous vehicle, the device comprising a processor and a memory including instructions that when executed by the processor cause the processor to detect that the autonomous vehicle has one or more malfunctioning components; determine, in response to the detection, a likelihood that the autonomous vehicle is able to reach a desired stop location based on one or more factors associated with the one or more malfunctioning components; determine at least one maneuver for the autonomous vehicle based on the likelihood; and cause the autonomous vehicle to perform the at least one maneuver.

Aspects of the present disclosure include that the processor determines the at least one maneuver to be one or more first maneuvers toward the desired stop location when the likelihood is at or above a threshold.

Aspects of the present disclosure include that the memory further comprises instructions that cause the processor to turn off the autonomous vehicle when the autonomous vehicle reaches the desired stop location.

Aspects of the present disclosure include that the memory further comprises instructions that cause the processor to determine whether the autonomous vehicle is operable in a degraded driving mode when the likelihood is at or below the threshold based on the one or more factors.

Aspects of the present disclosure include that the memory further comprises instructions that cause the processor to determine the at least one maneuver to be one or more second maneuvers toward a destination different than the desired stop location when the processor determines that the autonomous vehicle is operable in the degraded driving mode.

Aspects of the present disclosure include that the memory further comprises instructions that cause the processor to determine the at least one maneuver to be a stop operation that causes the autonomous vehicle to stop when the processor determines that the autonomous vehicle is not operable in the degraded driving mode.

Aspects of the present disclosure include that the memory further comprises instructions that cause the processor to continuously update the likelihood while the autonomous vehicle performs at least one of the one or more first maneuvers and the one or more second maneuvers, and to determine whether to change the at least one maneuver based on the updated likelihood.

Aspects of the present disclosure include that the one or more factors include at least one of an indication of a type of the one or more malfunctioning components, an indication of a type of malfunction of the one or more malfunctioning components, and an indication of a current effect or an anticipated effect of the type of malfunction on the autonomous vehicle.

Aspects of the present disclosure include that the memory further comprises instructions that cause the processor to determine the desired stop location based on at least one of sensed and received environmental surroundings of the autonomous vehicle.

Aspects of the present disclosure include that the one or more factors are stored in a table on the memory, and wherein the memory further comprises instructions that cause the processor to access the table to determine the likelihood.

Embodiments of the present disclosure include method for controlling an autonomous vehicle that includes detecting that the autonomous vehicle has one or more malfunctioning components; determining, in response to the detection, a likelihood that the autonomous vehicle is able to reach a desired stop location based on one or more factors associated with the one or more malfunctioning components, wherein the one or more factors include a safety score for each of the one or more malfunctioning components, wherein each safety score is indicative of an importance of a respective malfunctioning component to the operation of the autonomous vehicle; determining at least one maneuver for the autonomous vehicle based on the likelihood; and causing the autonomous vehicle to perform the at least one maneuver.

Aspects of the present disclosure include determining whether the autonomous vehicle is operable in a degraded driving mode when the likelihood is at or below the threshold based on the one or more factors.

Aspects of the present disclosure include that the determining the at least one maneuver includes determining the at least one maneuver to be one or more first maneuvers toward a destination different than the desired stop location when the autonomous vehicle is operable in the degraded driving mode; and determining the at least one maneuver to be a stop operation that causes the autonomous vehicle to stop when the autonomous vehicle is not operable in the degraded driving mode.

Aspects of the present disclosure include that the determining the at least one maneuver includes determining the at least one maneuver to be one or more second maneuvers toward the desired stop location when the likelihood is at or above a threshold.

Aspects of the present disclosure include that the method further comprises turning off the autonomous vehicle when the autonomous vehicle reaches the desired stop location.

Aspects of the present disclosure include that the method further comprises continuously updating the likelihood while the autonomous vehicle performs at least one of the one or more first maneuvers and the one or more second maneuvers; and determining whether to change the at least one maneuver based on the updated likelihood.

Aspects of the present disclosure include that the one or more factors include one or more weights that are applied to the one or more scores to determine the likelihood.

Aspects of the present disclosure include that the method further comprises determining the desired stop location based on environmental surroundings sensed by the vehicle and on information received from an external source.

Embodiments of the present disclosure include a system for controlling autonomous vehicles. The system includes a first device to: detect that a first autonomous vehicle has one or more malfunctioning components; determine, in response to the detection, a likelihood that the first autonomous vehicle is able to reach a desired stop location based on one or more factors associated with the one or more malfunctioning components; determine at least one maneuver for the first autonomous vehicle based on the likelihood; and cause the first autonomous vehicle to perform the at least one maneuver.

Aspects of the present disclosure include that the system further comprises at least one second device associated with at least one second autonomous vehicle, wherein the at least one second device generates information relating to the desired stop location based on surroundings sensed by the at least one second autonomous vehicle, and wherein the first device determines the desired stop location based on the information.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A device for controlling an autonomous vehicle, the device comprising:
    a processor; and
    a memory including instructions that when executed by the processor cause the processor to:
        detect that the autonomous vehicle has one or more malfunctioning components;
        determine, in response to the detection, a likelihood that the autonomous vehicle is able to reach a desired stop location based on one or more factors associated with the one or more malfunctioning components;
        determine at least one maneuver for the autonomous vehicle based on the determined likelihood; and
        cause the autonomous vehicle to perform the determined at least one maneuver,
    wherein the memory further comprises instructions that cause the processor to determine the at least one maneuver to be one or more first maneuvers toward the desired stop location when the determined likelihood is at or above a threshold, and
    wherein the memory further comprises instructions that cause the processor to determine, when the likelihood is at or below the threshold, whether the autonomous vehicle is operable in a degraded driving mode based on the one or more factors.

2. The device of claim 1, wherein the memory further comprises instructions that cause the processor to continuously update the determined likelihood while the autonomous vehicle performs the one or more first maneuvers.

3. The device of claim 1, wherein the memory further comprises instructions that cause the processor to turn off the autonomous vehicle when the autonomous vehicle reaches the desired stop location.

4. The device of claim 2, wherein the one or more factors are stored in a table on the memory, and wherein the memory further comprises instructions that cause the processor to access the table to determine the likelihood.

5. The device of claim 1, wherein the memory further comprises instructions that cause the processor to determine the at least one maneuver to be one or more second maneuvers toward a destination different than the desired stop location when the processor determines that the autonomous vehicle is operable in the degraded driving mode.

6. The device of claim 5, wherein the memory further comprises instructions that cause the processor to determine the at least one maneuver to be a stop operation that causes the autonomous vehicle to stop when the processor determines that the autonomous vehicle is not operable in the degraded driving mode.

7. The device of claim 5, wherein the memory further comprises instructions that cause the processor to continuously update the determined likelihood while the autonomous vehicle performs at least one of the one or more first maneuvers or the one or more second maneuvers, and to determine whether to change the determined at least one maneuver based on the continuously updated determined likelihood.

8. The device of claim 1, wherein the one or more factors include at least one of an indication of a type of the one or more malfunctioning components, an indication of a type of malfunction of the one or more malfunctioning components, or an indication of a current effect or an anticipated effect of the type of malfunction on the autonomous vehicle.

9. The device of claim 1, wherein the memory further comprises instructions that cause the processor to determine the desired stop location based on at least one of sensed or received environmental surroundings of the autonomous vehicle.

10. The device of claim 1, wherein the one or more factors are stored in a table on the memory, and wherein the memory further comprises instructions that cause the processor to access the table to determine the likelihood.

11. A method for controlling an autonomous vehicle, the method comprising:
    detecting that the autonomous vehicle has one or more malfunctioning components;
    determining, in response to the detection, a likelihood that the autonomous vehicle is able to reach a desired stop location based on one or more factors associated with the one or more malfunctioning components, wherein the one or more factors include a safety score for each of the one or more malfunctioning components, wherein each safety score is indicative of an importance of a respective malfunctioning component to an operation of the autonomous vehicle;
    determining, when the determined likelihood is at or below a threshold, whether the autonomous vehicle is operable in a degraded driving mode based on the one or more factors; and
    determining at least one maneuver for the autonomous vehicle based on the determined likelihood;
    causing the autonomous vehicle to perform the determined at least one maneuver.

12. The method of claim 11, wherein the one or more factors include at least one of an indication of a type of the one or more malfunctioning components, an indication of a type of malfunction of the one or more malfunctioning components, or an indication of a current effect or an anticipated effect of the type of malfunction on the autonomous vehicle.

13. The method of claim 11, wherein the determining the at least one maneuver includes:
    determining the at least one maneuver to be one or more first maneuvers toward a destination different than the desired stop location when the autonomous vehicle is operable in the degraded driving mode; and
    determining the at least one maneuver to be a stop operation that causes the autonomous vehicle to stop when the autonomous vehicle is not operable in the degraded driving mode.

14. The method of claim 13, wherein the determining the at least one maneuver includes determining the at least one maneuver to be one or more second maneuvers toward the desired stop location when the determined likelihood is at or above the threshold.

15. The method of claim 14, further comprising:
    turning off the autonomous vehicle when the autonomous vehicle reaches the desired stop location.

16. The method of claim 15, further comprising:
    continuously updating the determined likelihood while the autonomous vehicle performs at least one of the one or more first maneuvers or the one or more second maneuvers; and
    determining whether to change the at least one maneuver based on the continuously updated determined likelihood.

17. The method of claim 11, wherein the one or more factors include one or more weights that are applied to one or more safety scores to determine the determined likelihood.

18. The method of claim 11, further comprising:
    determining the desired stop location based on environmental surroundings sensed by the autonomous vehicle and on information received from an external source.

19. A system for controlling autonomous vehicles, the system comprising:
    a first device to:
        detect that a first autonomous vehicle has one or more malfunctioning components;
        determine, in response to the detection, a likelihood that the first autonomous vehicle is able to reach a desired stop location based on one or more factors associated with the one or more malfunctioning components;
        determine, when the likelihood is at or below a threshold, whether the autonomous vehicle is operable in a degraded driving mode based on the one or more factors;
        determine at least one maneuver for the first autonomous vehicle based on the determined likelihood; and
        cause the first autonomous vehicle to perform the determined at least one maneuver.

20. The system of claim 19, further comprising:
    at least one second device associated with at least one second autonomous vehicle, wherein the at least one second device generates information relating to the desired stop location based on surroundings sensed by the at least one second autonomous vehicle, and wherein the first device determines the desired stop location based on the information.

* * * * *